C. E. MILLER.
VULCANIZING APPARATUS.
APPLICATION FILED OCT. 26, 1911.
1,142,526.
Patented June 8, 1915.
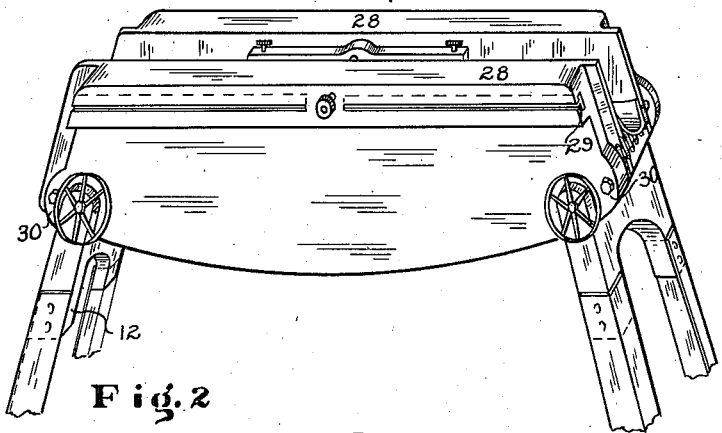
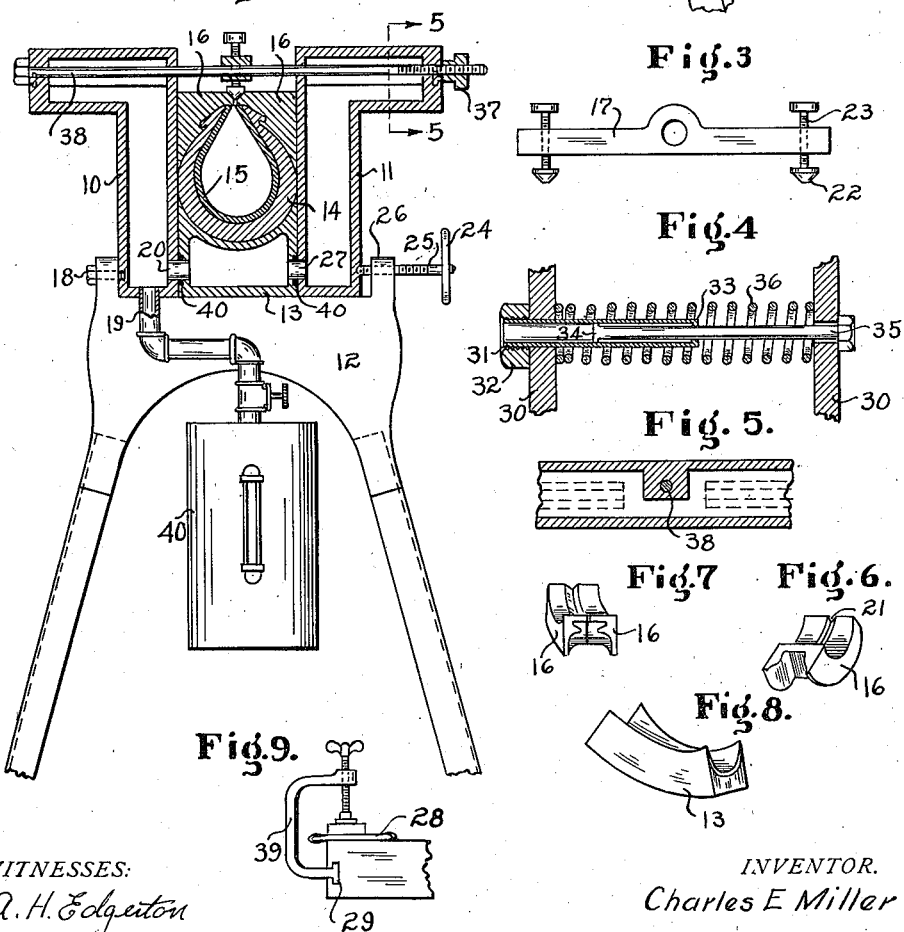
WITNESSES:
A. H. Edgerton
O. M. McLaughlin
INVENTOR.
Charles E Miller
BY
V. H. Lockwood
ATTORNEY.

UNITED STATES PATENT OFFICE.

CHARLES E. MILLER, OF ANDERSON, INDIANA.

VULCANIZING APPARATUS.

1,142,526.  Specification of Letters Patent.  Patented June 8, 1915.

Application filed October 26, 1911. Serial No. 656,963.

*To all whom it may concern:*

Be it known that I, CHARLES E. MILLER, a citizen of the United States, and a resident of Anderson, county of Madison, and State of Indiana, have invented a certain useful Vulcanizing Apparatus; and I do hereby declare that the following is a full, clear, and exact description thereof, reference being had to the accompanying drawings.
In vulcanizing apparatus it has been the common practice to have a mold or form for each size of tire commonly used, thus necessitating quite a heavy investment in vulcanizing apparatus as well as requiring considerable storing space.

It is the object of this invention to provide a vulcanizing apparatus which shall be capable of being adapted for use with all sizes of tires from the smallest bicycle tire up to the largest automobile tire.

The features of the invention lie in providing adjustable side members to which heat is applied and between which tread and rim or bead covering shoes may be secured about the tire together with means whereby the same side members may be used for vulcanizing flat work, such as inner casings and the like, and other features hereinafter set forth.
The nature of the invention will be understood from the accompanying drawings and the following description and claim.

In the drawings, Figure 1 is a perspective of the device. Fig. 2 is a vertical transverse section of the upper portion and midway thereof, and with a tire secured therein ready to be operated upon. Fig. 3 shows in side elevation the means for securing the bead shoe. Fig. 4 is a section through the ears shown at either end of Fig. 1, showing the means for separating the members. Fig. 5 is a vertical longitudinal section on the line 5—5 of Fig. 2. Figs. 6 and 7 are perspectives of different bead shoes. Fig. 8 is a perspective of the tread shoe. Fig. 9 shows the means for adapting the top of the steam box for vulcanizing a flat surface.

In detail there is shown in the drawings, a vulcanizing apparatus having heating chambers 10 and 11 supported upon legs 12 and with a tread shoe 13 between said heating chambers upon which a tire 14 is placed having inner casing 15, and with bead shoes 16 surrounding the inner portion of the tire and the beads thereon and held in place by a clamping bar 17.

The hollow heating chamber 10 is substantially L-shaped in cross section, as shown in Fig. 2, and is secured to the legs
12 by means of bolts 18 and is supplied with steam from any convenient source through a pipe 19. There is a port 20 through the inner wall of said chamber and near the bottom which communicates with the hollow tread shoe 13. Said tread shoe 13 has a flat bottom and the sides thereof which extend upwardly at right angles, lie against the vertical walls of the heating chambers 10 and 11. The upper face is concave in both directions and it is adapted to fit the tread of an automobile tire. The bead shoes 16 may be formed of only one part, as shown in Fig. 6, or of two parts, as shown in Fig. 7, and conform to the outline of the inner side of the tire and the bead by which it is secured to the rim of the wheel. They are necessarily convex longitudinally. The outer sides thereof are plane and are adapted to lie against the inner vertical sides of the steam chambers 10 and 11. The upper face is concave and has a small groove midway between the vertical sides into which fit the tapering button-like heads 22 on the bolts 23 on the clamping bar 17.

The heating chamber 11 is similar to the chamber 10 excepting that it is free to slide upon the legs 12 and is forced inwardly by hand wheels 24 on the screws 25 extending through upward lugs 26 on the legs 12. The chamber 11 is supplied with steam from the chamber 10 through the port 20 in the chamber 10 and a port 27 in the chamber 11 leading to the central part of the tread shoe 13. The upper faces 28 of the chambers 10 and 11 are flat for the purpose, hereinafter mentioned, and there is a T-shaped slot 29 in the vertical outer faces, as shown in Figs. 1 and 2, extending longitudinally thereof substantially their entire length. There are projecting ears 30 at either end of said steam boxes 10 and 11 through which a spring bolt extends for forcing the steam boxes apart when the screws 25 are withdrawn.

The spring bolt is formed, as shown in Fig. 4; there being a tubular member 31 with a nut 32 thereon extending through one of the ears 30 and having an internal shoulder 33 at the inner end thereof which engages the shouldered nut 34 of the bolt 35 extending through the ear of the other steam chamber. A spring 36 bears against the lugs 30 and tends to force them apart to the limit allowed by the tubular bolt 31 and bolt 35. The outer movement of the upper end of the steam chambers is limited by a nut 37 on a bolt 38 extending through said bolt across the clamping bar 17 by which the bead-shoes are clamped in place.

Should it be desired to vulcanize the surface of a portion of an inner tire or other rubber fabric which may be flattened out, a clamp 39 may be inserted into one of the slots 29 on either side of the steam chambers, and the work may be held on the flat upper surface 28 of the steam chamber.

It will be readily understood that it will be necessary to have a tread member 10 and bead members 16 for each different size of tire, but the steam chambers 10 and 11 may be used for all of the different sizes by moving them toward or away from each other by means of the hand wheel 24 and the assistance of the bolt 38 and nut 37. The steam may come from any desired source of power, whether from a large boiler some distance from the apparatus or from the small boiler 40, located beneath the device, as shown in Fig. 2.

The inner casing 15 is well known and is used to distend the tire to its normal size. The device may be placed upon a bench or table or the legs may have angle iron extensions added, as shown in Fig. 2, and supported from the floor.

Should the spot on a tire needing repairs be to one side of the tread, the tire may be so inserted in the vulcanizing apparatus that the worn place is adjacent the heating chamber 10, and the steam passage 27 may be stopped off by inserting a thin plate in the counter-bore 40 surrounding the steam opening in the tread member 13. Thus no steam is allowed to enter the chamber 11 and only that portion of the tire is heated which actually requires heat.

I claim as my invention:

Vulcanizing apparatus including a pair of oppositely located heating chambers, a hollow tread shoe located between said heating chambers, a pair of bead shoes between said heating chambers and above said tread shoe and placed side by side, and a downwardly acting wedge-shaped means for engaging said bead shoes at their adjacent edges and simultaneously forcing them downward and laterally against the heating chambers.

In witness whereof, I have hereunto affixed my signature in the presence of the witnesses herein named.

CHARLES E. MILLER.

Witnesses:
G. H. BOINK,
E. H. MAYO.